US008997080B2

(12) United States Patent
Larkin et al.

(10) Patent No.: US 8,997,080 B2
(45) Date of Patent: Mar. 31, 2015

(54) SYSTEM UPDATES WITH PERSONAL VIRTUAL DISKS

(71) Applicant: Citrix Systems, Inc., Fort Lauderdale, FL (US)

(72) Inventors: Michael Larkin, San Jose, CA (US); Shashikiran Uli, Sammamish, WA (US); William DeForeest, Snohomish, WA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 227 days.

(21) Appl. No.: 13/764,295

(22) Filed: Feb. 11, 2013

(65) Prior Publication Data

US 2014/0229934 A1 Aug. 14, 2014

(51) Int. Cl.
G06F 9/44 (2006.01)
G06F 9/455 (2006.01)
G06F 9/445 (2006.01)

(52) U.S. Cl.
CPC .............. *G06F 9/45533* (2013.01); *G06F 8/65* (2013.01); *G06F 9/4445* (2013.01)
USPC ................................ 717/168; 717/171; 718/1

(58) Field of Classification Search
None
See application file for complete search history.

(56) References Cited

U.S. PATENT DOCUMENTS

| | | | | |
|---|---|---|---|---|
| 8,359,594 | B1 * | 1/2013 | Davidson et al. ................. | 718/1 |
| 8,555,274 | B1 * | 10/2013 | Chawla et al. .................... | 718/1 |
| 2007/0180450 | A1 * | 8/2007 | Croft et al. ........................ | 718/1 |
| 2008/0282243 | A1 * | 11/2008 | Seguin et al. ..................... | 718/1 |
| 2009/0106748 | A1 * | 4/2009 | Chess et al. .................... | 717/168 |
| 2009/0216975 | A1 | 8/2009 | Halperin et al. | |
| 2009/0260007 | A1 | 10/2009 | Beaty et al. | |
| 2010/0106885 | A1 * | 4/2010 | Gao et al. .......................... | 711/6 |
| 2010/0235825 | A1 | 9/2010 | Azulay et al. | |
| 2011/0055299 | A1 * | 3/2011 | Phillips ......................... | 707/827 |
| 2011/0265083 | A1 * | 10/2011 | Davis ................................ | 718/1 |
| 2012/0084768 | A1 * | 4/2012 | Ashok et al. .................. | 717/174 |
| 2012/0304168 | A1 | 11/2012 | Raj Seeniraj et al. | |
| 2013/0007733 | A1 * | 1/2013 | Fries et al. ........................ | 718/1 |
| 2013/0007736 | A1 * | 1/2013 | Nakajima ......................... | 718/1 |
| 2013/0132945 | A1 * | 5/2013 | Anderson et al. ................. | 718/1 |
| 2014/0189677 | A1 * | 7/2014 | Curzi et al. .................... | 717/171 |

OTHER PUBLICATIONS

PCT/US2014/015549 International Search Report dated Jun. 26, 2014.

* cited by examiner

*Primary Examiner* — Lewis A Bullock, Jr.
*Assistant Examiner* — Tina Huynh
(74) *Attorney, Agent, or Firm* — Banner & Witcoff, Ltd.

(57) ABSTRACT

A method and system for updating a collection of software resources in a virtual desktop infrastructure system. Virtual machines associated with sets of virtual disk elements in a hierarchy of disk layers, such as basic, department, or user virtual disks are offered updates for one or more available software resources. Updates available for deployment in the virtual desktop infrastructure system are recorded in a database by a controller server. The controller server takes an inventory of all the virtual machines associated with each disk layer in the hierarchy of disk layers on which to apply the available updates. The controller server applies the one or more updates to the identified virtual machines, and stores the update application results in a database. The controller server may apply the one or more updates to virtual machines associated with descendant disk layers in the hierarchy of disk layers in view of previous applications of the updates.

21 Claims, 7 Drawing Sheets

SYSTEM UPDATES WITH PERSONAL VIRTUAL DISKS

FIELD

This application generally relates to computer virtualization, and creating and managing virtual machines. In particular, aspects are related to management of updates for virtual machines in a desktop virtualization system.

BACKGROUND

Traditionally, personal computer configurations include combinations of operating systems, applications, and user settings, which are each managed individually by owners or administrators on an ongoing basis. However, many organizations are now using desktop virtualization systems to provide more flexible options to address the varying needs of their users. In a desktop virtualization system, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual machines and allow users to interconnect to them. For example, a VDI server may include one or more hypervisors (virtual machine managers) to create and maintain multiple virtual machines, software to manage the hypervisor(s), a connection broker, and software to provision and manage the virtual desktops. VDI management is a complex and tedious process.

Desktop virtualization systems may include one or more virtual disk layers that comprise a hierarchy of disk layers or "disk tree." Each disk layer in the hierarchy of disk layers is comprised of one or more virtual disks. The composition of these disk layers may take place through various means. Disk trees are involved in a run-time merge performed during operating system boot, which provides information relating to the data contained in each disk tree, and results in the generation of one or more virtual machines for utilization by the end user.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

Updating computer systems in a VDI system is a monthly if not weekly or daily occurrence in modern computing. Newly discovered security threats, new versions of software, and interesting new applications all may require changing the data stored in a computer disk. For example, in Information Technology departments where VDI systems are typically deployed, there may be a central update management system that manages available updates and publishes them to target computer systems using a mix of algorithms and choices made by a human operator. However, the choice of target system sets can be very broad and imprecise. Furthermore, the human operator may likely target a wide range of possible systems and rely on a per-system filtering process to prevent system error. Thus, aspects described herein provide improved systems and methods for updating a collection of software resources in a virtual desktop infrastructure system. As used herein, updates may include patches, software updates, and any other software maintenance that may need to be applied to one or more software resources.

According to certain aspects of the disclosure, an update management database, configured to receive a plurality of updates for one or more software resources, publishes one or more updates to a hierarchy of disk layers. A controller server records the one or more updates in a data storage. The controller server then identifies a plurality of virtual machines for each disk layer in the hierarchy of disk layers and applies the one or more updates to one or more virtual machines in a predetermined disk layer in the hierarchy of disk layers. The results of the attempt to apply the one or more updates are stored at the controller server. If the update is successful for a given target virtual machine, application of the one or more published updates to each virtual machine in the plurality of virtual machines associated with subsequent disk layers in the hierarchy of disk layers is suspended. If the update was not successful for a given target virtual machine, then the one or more published updates are applied to each virtual machine in the plurality of virtual machines associated with the disk layer immediately descendant to the predetermined disk layer. This iterative process continues until all virtual machines have been targeted with the published updates or all remaining virtual machines that are to be targeted with the one or more published updates are descendants of systems that were already successfully updated.

According to additional aspects of the disclosure, the update management database may receive an update for one or more software resources. The controller server records this new update a data store, and identifies one or more available software resources that may be targeted by the update. Additionally, the controller server identifies each disk layer in a hierarchy of disk layers having one or more of the identified software resources targeted by the update. The controller server also determines and identifies the lowest disk layer in the hierarchy of disk layers having one or more of the identified software resources. Thereafter, the controller server may target the appropriate virtual machines in the identified disk layer to receive the update, and each descendant virtual machine, if any, may receive the update during subsequent iterations of applying the update to descendant disk layers.

BRIEF DESCRIPTION OF THE DRAWINGS

Figure 1:
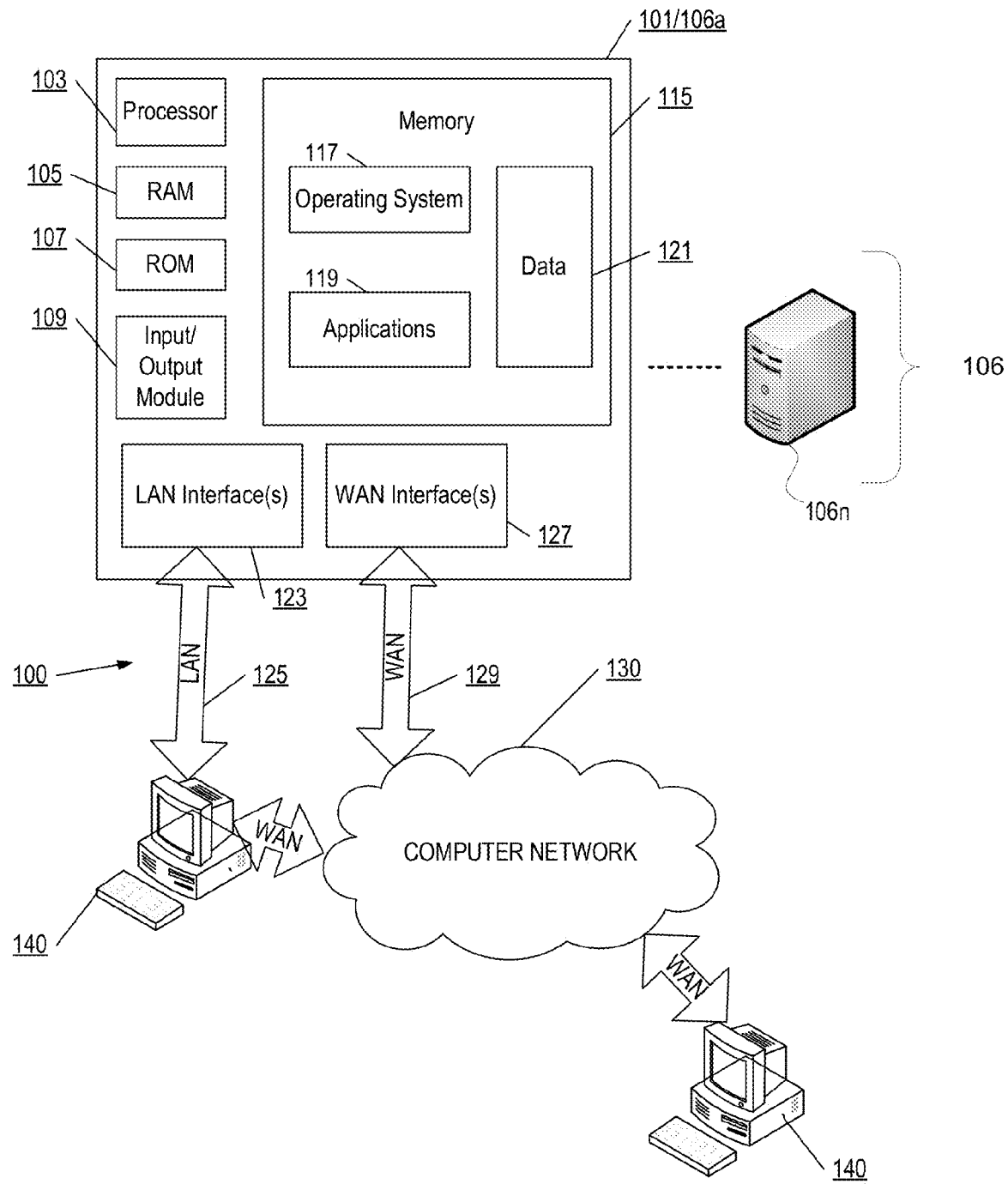

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
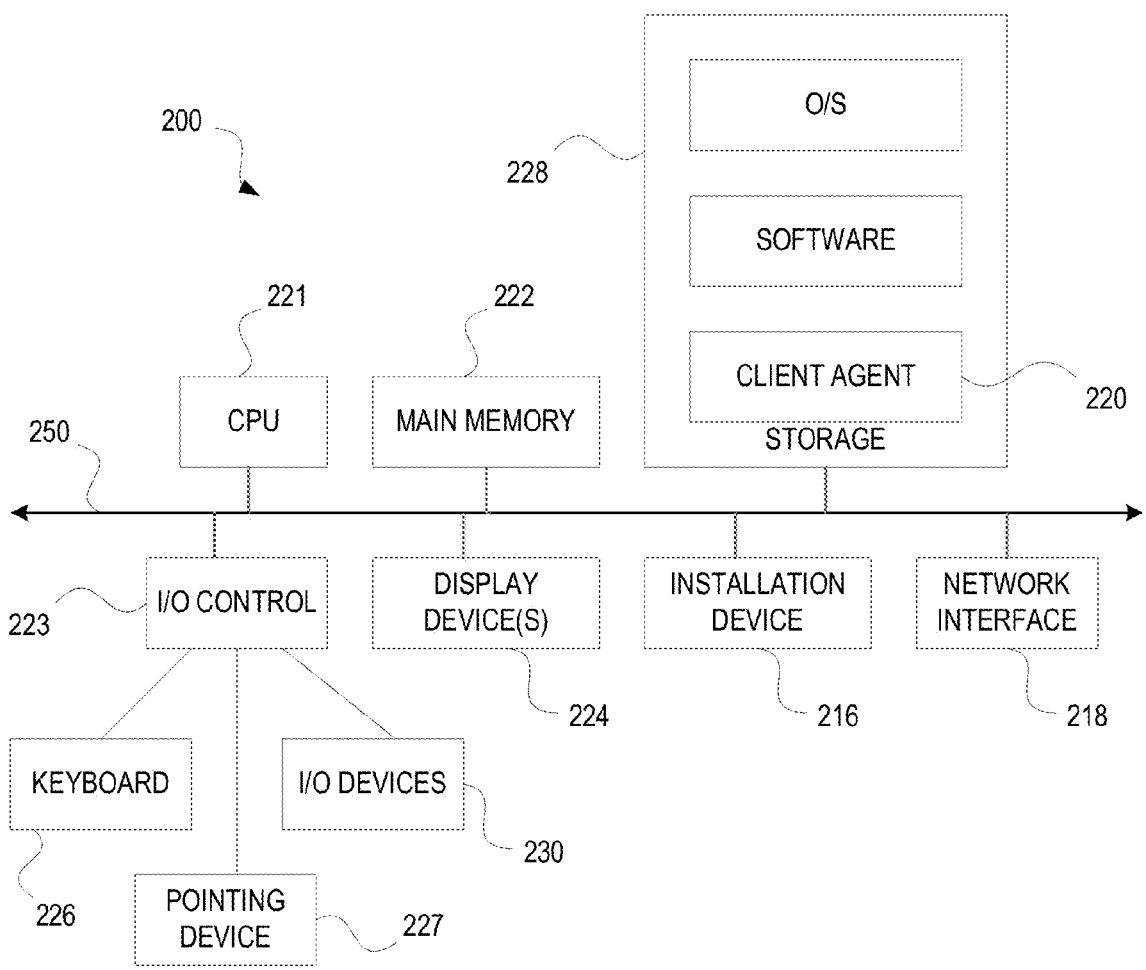

FIG. 2 illustrates a computing device that may be used in accordance with one or more illustrative aspects described herein.

Figure 3:
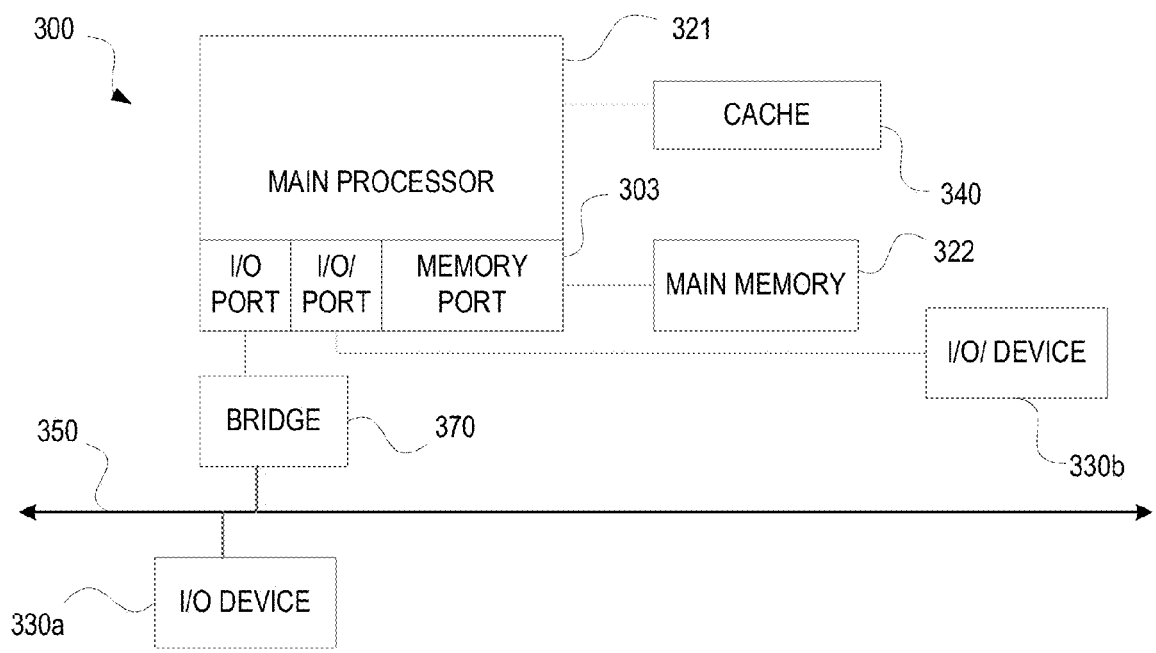

FIG. 3 illustrates a computing device that may be used in accordance with one or more illustrative aspects described herein.

Figure 4:
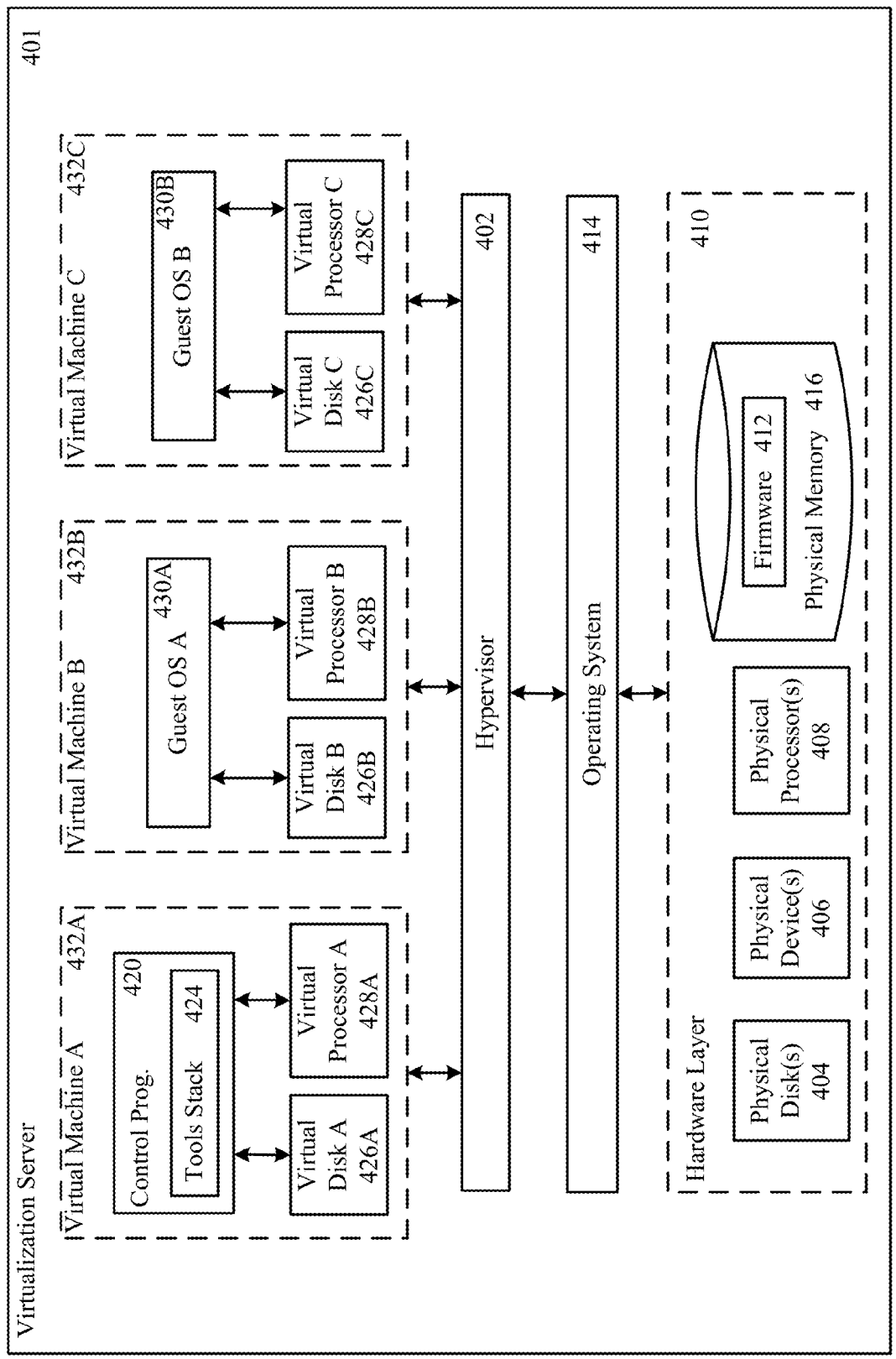

FIG. 4 is a block diagram that depicts embodiments of a virtualization server in accordance with one or more illustrative aspects described herein.

Figure 5:
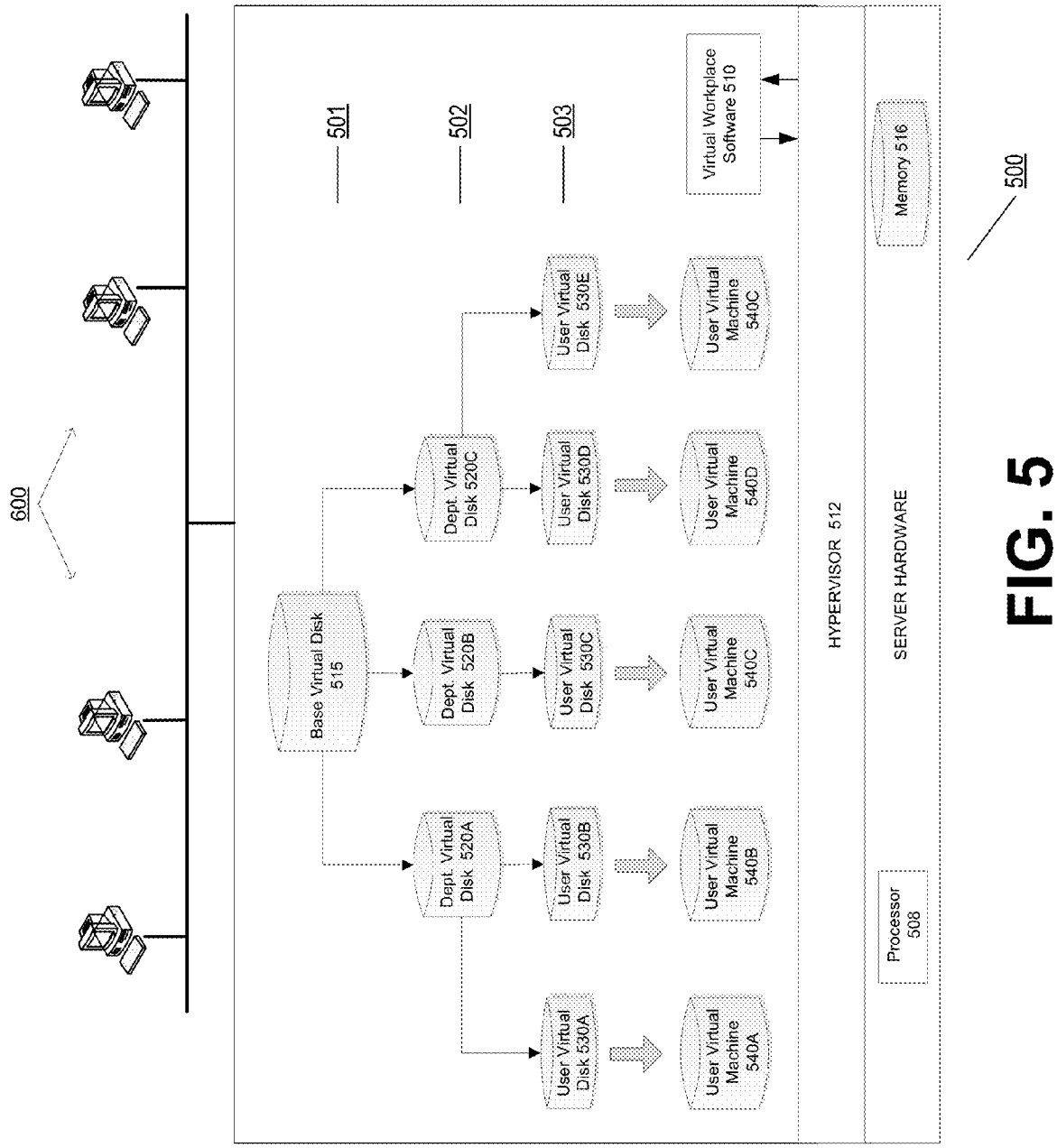

FIG. 5 illustrates a block diagram that depicts embodiments of a virtual desktop infrastructure system in accordance with one or more illustrative aspects described herein.

Figure 6:
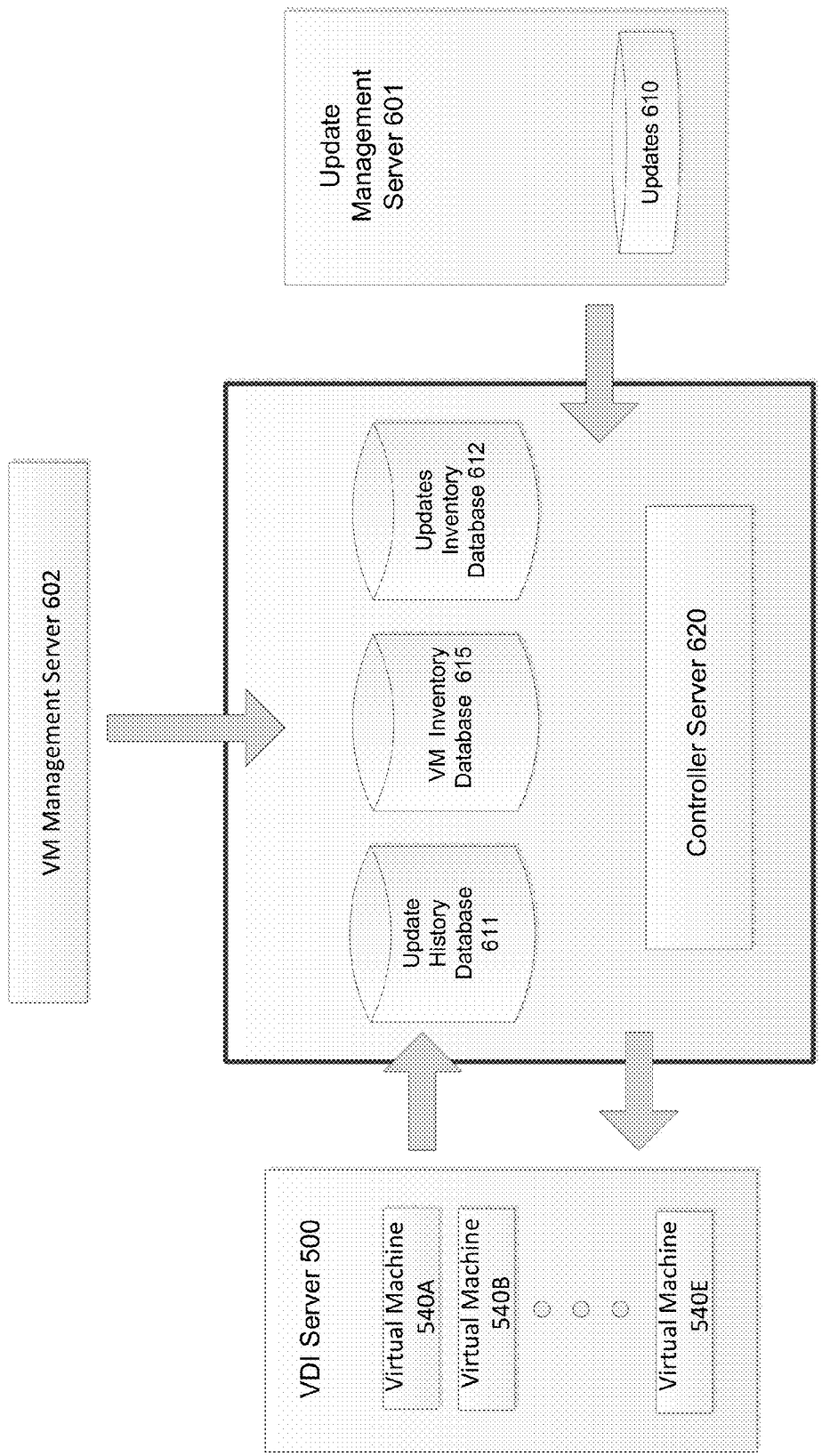

FIG. 6 is a block diagram illustrating certain components used for monitoring and managing updates for software resources in a virtual desktop infrastructure system, in accordance with one or more illustrative aspects described herein.

Figure 7:
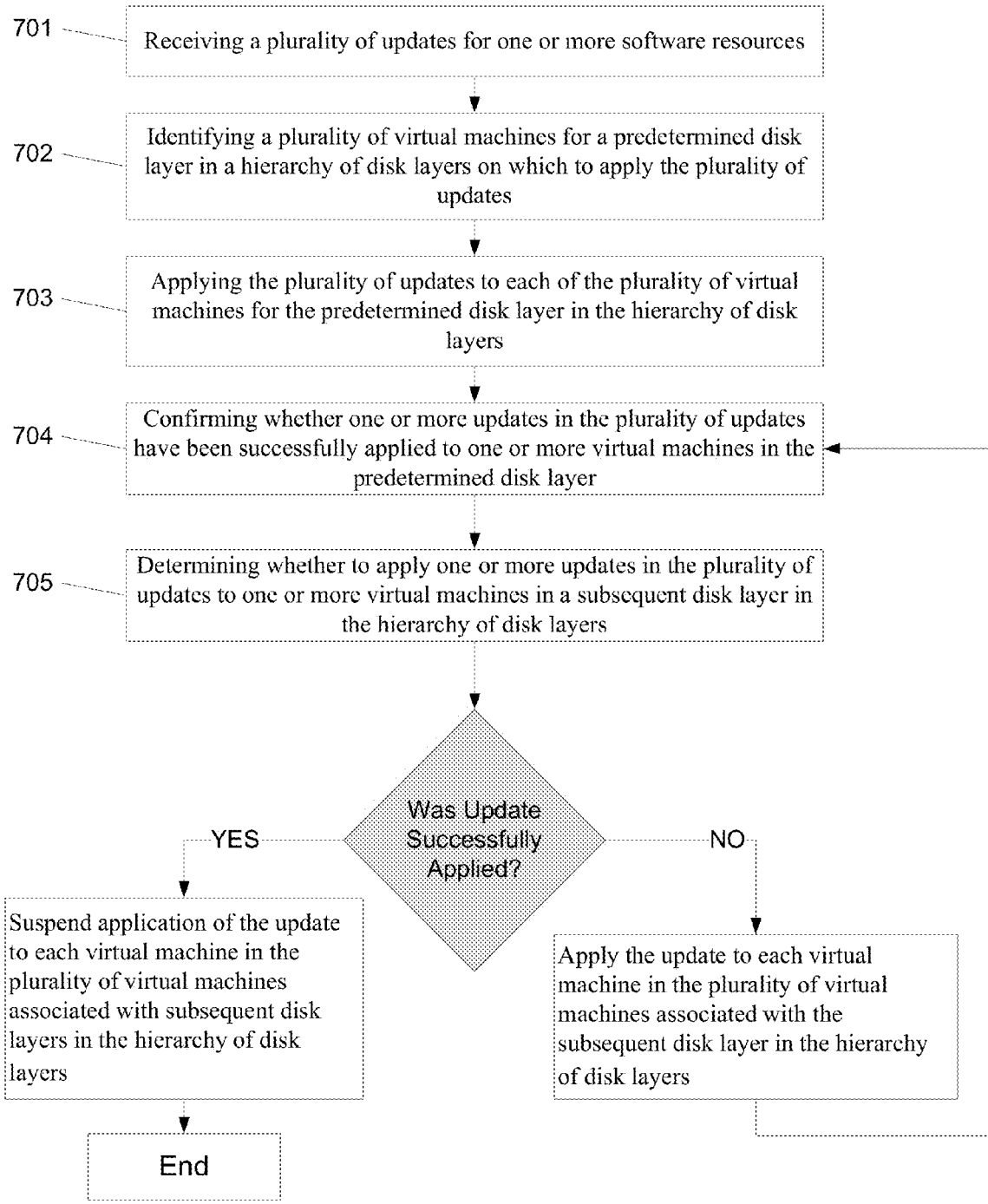

FIG. 7 is a flow diagram illustrating an example process of updating a collection of software resources in a virtual desktop infrastructure system, in accordance with one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In addition, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server's applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224*a*-224*n*; any type and/or form of video adapter, video card, driver, and/or library to interface, communicate, connect or otherwise use the display devices 224*a*-224*n*. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the i300 or i330, manufactured by Samsung Electronics Co., Ltd; the 6035 or the 7135, manufactured by Kyocera; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95c1, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, or cloud system, including at least one virtualization server 106 configured to provide virtual machines and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrated in FIG. 4 is one embodiment of a computer device 401 configured as a virtualization server in a virtualization environment, for example, a single-server, multi-server, or cloud computing environment. The virtualization server 401 illustrated in FIG. 1 can be deployed as and/or implemented by one or more embodiments of the server 106 illustrated in FIG. 1 or the computing devices 200 and 300 illustrated in FIGS. 2 and 3. Included in virtualization server 401 is a hardware layer that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can executed, on a virtual processor 428B-C, a guest operating system 430A-B.

Further referring to FIG. 4, and in more detail, the virtualization server 401 may include a hardware layer 410 with one or more pieces of hardware that communicate with the virtualization server 401. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g. optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program that executed by processors 408 on the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. A Type 1 hypervisor may execute directly on one or more physical processors of 408 the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks; physical processors; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may executes a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may presents at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 is a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the virtual processor 408 provides a modified view of the physical processors 408 such that at least some of the characteristics of the virtual processor 428 are different than the characteristics of the corresponding physical processor 408.

FIG. 5 illustrates a block diagram that depicts embodiments of a virtual desktop infrastructure system, in accordance with one or more illustrative aspects described herein. In brief overview, the system includes a plurality of virtual machines. Referring to FIG. 5, a diagram is shown illustrating a high-level architecture of an illustrative desktop virtualization system. In this example, virtual desktop infrastructure system, which may be referred to as desktop virtualization system, includes a server 500 (e.g., a VDI server) configured to provide virtual desktops to one or more client access devices 600. The server 500 includes a processor 508 and memory 516, and may include one or more of the features of the general computing device 101 discussed above.

In this example, the server 500 includes a hypervisor 512 capable of creating and managing virtual machines on the server 500. The hypervisor 512 is a software layer that may execute directly on the hardware of the server 500, or may execute within the operating system of the server 500. The hypervisor 512 may include one or more of the features of the general computing device 402 discussed above. Although only one hypervisor 502 is shown in this example, servers in desktop virtualization systems may include multiple different hypervisors 512, each supporting its own set of virtual machines 540. Virtual machines 540, may include one or more of the features of the general computing device 432 discussed above.

The server 500 may also include virtual workplace software 510. The virtual workplace software 510 may include one or more software components having the functionality to control the hypervisor 512, create and manage virtual machines 530, and to enable authorized access to the virtual machines 530 by end users at client access devices 600. As shown in this example, the virtual workplace software 510 may execute on the hypervisor 512 within server 500. For example, the virtual workplace software 510 may run as a virtual machine on the hypervisor 512 that it manages. In other examples, virtual workplace software 510 may execute as an application on a separate machine different from the server 500, and may communicate with the hypervisor 512 via a network protocol.

Each virtual machine 540 created and/or managed by the virtual workplace software 510 may support one or more virtual desktops for users at client devices 600. Clients 600 may connect to a virtual machine 540 over a network (e.g., the Internet 130) to initiate a virtual desktop for a user at the client device 600 (e.g., thin client, laptop, or mobile device, etc.). For example, users may use web browser software to access a web-based console provided by the virtual workplace software 510. In other examples, a graphical user interference client application may be installed on the client devices 600 which is designed to connect to and communicate with the virtual workplace software 5100. When a user at client device 600 attempts to access the virtual workplace software 510 to initiate a virtual desktop session, or to perform any of the management or administrative functions of the desktop virtualization system, the virtual workplace software 510 may authenticate the user to confirm that the user has the proper authority to perform the functions requested by the user. After the user has been authenticated, the virtual workplace software 510 may select a virtual machine 540 for the user's virtual desktop session and provide the user with the Internet Protocol (IP) address of the selected virtual machine 540 and/or may connect the user's access device 600 to the remote desktop protocol client running on the virtual machine 540. Further, the virtual workplace software 510 may control the hypervisor 512 to create the virtual machines 540 running the virtual desktops for clients 600.

In one embodiment, the desktop virtualization system may include one or more VDI servers 500. In another embodiment, the desktop virtualization system may include one or more hierarchy of disk layers. In some embodiments, the hierarchy of disk lawyers may be stored on VDI server 500, as illustrated in FIG. 5. In other embodiments, the hierarchy of disk lawyers may be stored on any storage device accessible by hypervisor 512. Each hierarchy of disk layers, which may be referred to as a "disk tree," is comprised of a plurality of disk layers. The number of disk layers in each "disk tree" can be arbitrarily large. For example, FIG. 5 illustrates one embodiment of a "disk tree" that includes three disk layers (e.g., 501, 502, 503). The lowest disk layer in the hierarchy of disk layers is base disk layer 501, which includes a single base virtual disk 515. In some of these embodiments, the desktop virtualization system utilizes base virtual disk 515 for operating system software resources and globally required software resources. The next layer in the hierarchy of disk layers is department disk layer 502, which includes a series of virtual disks 520 for each department in the desktop virtualization system. In other of these embodiments, the desktop virtualization system utilizes department disk layer 502 for per-department applications and software resources. The highest layer in the hierarchy of disk layers is user disk layer 503, which may include a series of virtual disks 530 corresponding to one or more users in the desktop virtualization system. In another of these embodiments, the desktop virtualization system utilizes user disk layer 503 for per-user applications and software resources.

The composition of the plurality of disk layers in the hierarchy of disk layers may take place through various means, such as differencing disks or Personal Virtual Disks. These systems will perform a run-time merge of the one or more "disk trees," providing a uniform view of data contained in each disk tree according to a set of rules or heuristics that define which resources from a given disk layer take precedence over matching or conflicting resources in other disk layers. This boot-time combination is performed during operating system boot, at a sufficiently early phase to allow combination of disk layers in a way that is consistent for the life of the boot. Accordingly, the boot-time combination generates a set of full virtual machines 540 for use by each end user in the desktop virtualization system. In some embodiments, a disk combination algorithm is utilized to combine the plurality disk layers when booting VDI server 500. Accordingly, for any number of virtual machines desired, the VDI server 500 can chose a single base disk, (e.g., base virtual disk 515) that includes the desired operating system type and version for that particular virtual machine. In some embodiments, base virtual disk 515 can also include any software applications or other resources that are to be globally available to all derived virtual machine instances.

For example, a desktop virtualization system having a plurality of "disk tree" arrangements, may contain one or more base virtual disks for each different operating system version in the virtualization system. Accordingly, each virtual base disk 515 may spawn its own "tree" of descendant virtual disks in higher disk layers (e.g., 502, 503) and resulting virtual machines 540. Given that many virtual machines can incorporate base virtual disk 515, only one instance needs to be stored and managed. This embodiment of a desktop virtualization system saves tremendous amounts of disk storage and computer cycles that would otherwise be required to store and maintain individual versions for every virtual machine operated by a user. This same analysis applies to the "tree" of virtual disks descending from base virtual disk 515. For example, department disk layer 502 may include an entire department of employees wherein each department may have a plurality of virtual disks 520 to store applications and software resources unique to that department. Likewise, only the data, applications, and software resources truly unique to each user in the desktop virtualization system are stored at unique disk (e.g., 530A-E) in user disk layer 503. For instance, a user installing his or her personal favorite browser, document reader, or other unique application may be stored at the user's virtual disk 530 in user disk layer 503. User disk layer 503 is often referred to as the Personal Virtual Disk (PVD).

FIG. 6 is a block diagram illustrating certain components used for a system of managing updates within a desktop virtualization system, in accordance with one or more illustrative aspects described herein. In brief overview, the system includes an update management server 601, a controller server 620, and a VDI server 500. The desktop virtualization system also includes an update history database 611, a virtual machine inventory database 615, an updates inventory database 612, and a plurality of updates for one or more software resources. The update management server 601 receives a plurality of updates for the one or more software resources to be deployed to virtual machines in the desktop virtualization environment. The update management server 601 publishes one or more proposed updates in the received plurality of updates. The controller server 620 requests an identification from update management server 601 for the one or more published updates. The controller server 620 receives an identification of the one or more published updates, and stores said updates in updates inventory database 612. The controller server 620 identifies a plurality of virtual machines 540 for a predetermined disk layer in the one or more hierarchy of disk layers within VDI server 500 on which to apply the one or more updates in the plurality of updates.

The controller server 620 applies the one or more updates in the plurality of updates to each of the plurality of virtual machines associated with the predetermined disk layer in the hierarchy of disk layers within VDI server 500. The controller server 620 analyzes each of the plurality of virtual machines receiving the one or more updates in the plurality of updates to confirm whether one or more updates in the plurality of updates were applied successfully to the predetermined disk layer. Information relating to the results of each attempt to install the one or more updates in the plurality of updates is transmitted to controller server 620. The controller server 620 stores the update installation results in update history database 611. The controller server 620 determines whether to apply one or more updates in the plurality of updates to a subsequent (i.e., higher) disk layer in the hierarchy of disk layers within VDI server 500. In the event the controller server 620 determines that an update in the plurality of updates has been successfully applied to the predetermined disk layer, then the application of the update to subsequent disk layers in the hierarchy of disk layers is suspended. In the event the controller server 620 determines that an update in the plurality of updates has not been successfully applied to the predetermined disk layer, the update is applied to each of the plurality of virtual machines for the subsequent disk layer in the hierarchy of disk layers.

In some embodiments, update management server 601 sends a request for at least one update in the plurality of updates for the one or more software resources to be deployed to one or more virtual machines in the desktop virtualization environment. In some of these embodiments, a VDI administrator identifies the one or more updates to transmit to the update management server 601. In another embodiment, the update management server 601, transmits a request for a plurality of updates available for application in the desktop virtualization environment. In other embodiments, the plurality of updates for one or more software resources in the desktop virtualization system are stored in updates database 610. In yet other embodiments, updates database 610 stores an inventory of all system updates received by update management server 601. In some embodiments, updates database 610 communicates with updates inventory database 612 to exchange data regarding the inventory of all system updates. In other embodiments, the data representing the inventory of all system updates stored in the updates database 610 is replicated to generate update inventory database 612. In still other embodiments, update management server 601 may transfer data representing the inventory of all system updates to update inventory database 612.

In another embodiment, the updates database may be accessed by a controller server residing on a virtual machine. In one of these embodiments, the updates database may exchange data with a local database residing on one or more virtual disks in the hierarchy of disk layers. In another of these embodiments, the controller residing on the virtual machine may communicate with update management server 601 to identify available updates for the desktop virtualization system.

In some embodiments, a user may identify one or more updates in the plurality of updates to apply to virtual machines in the desktop virtualization environment. In other embodiments, the desktop virtualization environment may include a graphical user interface. In some of these embodiments, the graphical user interface may be configured to indicate the plurality of available updates for deployment in the desktop virtualization system. In other of these embodiments, the graphical user interface may be configured to indicate the plurality of virtual machines descending from the one or more virtual machines in each disk layer of the one or more hierarchy of disk layers within VDI server 500. In another of these embodiments, the graphical user interface may be configured to indicate the one or more virtual machines in the plurality of virtual machines representing the immediate descendant virtual disks in a subsequent disk layer in the hierarchy of disk layers. In still another of these embodiments, the graphical user interface may be configured to permit the user to identify one or more virtual machines to receive one or more updates in the plurality of available updates for deployment in the desktop virtualization system.

In one embodiment, controller server 620 stores in updates inventory database 612 the one or more available updates in the plurality of updates to be deployed in the desktop virtualization system. In another embodiment, controller server 620 identifies a predetermined disk layer in the one or more hierarchy of disk layers on which to apply the one or more available updates. In some of these embodiments, controller server 620 identifies the predetermined disk layer by analyzing the one or more available updates to be applied to the desktop virtualization system. In another of these embodiments, controller server 620 retrieves information from virtual machine inventory database 615 relating to the one or more available updates to be applied to the desktop virtualization system.

In some embodiments, the controller server is stored inside one or more virtual machines in the desktop virtualization system. In one of these embodiments the controller communicates with update management server 601 to identify one or more available updates for the desktop virtualization system.

In some embodiments, virtual machine inventory database 615 stores data regarding the inventory of virtual machines within the desktop virtualization system. In other embodiments, virtual machine inventory database 615 stores data regarding the inventory of virtual machines being managed by virtual machine management server 602. In some of these embodiments, virtual machine inventory database 615 identifies one or more virtual machines associated with a predetermined disk layer. For example, referring to FIG. 5, virtual machine inventory database 615 may identify one or more virtual machines associated with a department virtual disk 520. As another example, virtual machine inventory database 615 may identify one or more virtual machines associated with a base virtual disk 515. In some embodiments, virtual machine inventory database 615 identifies the relationship among each of the virtual machines in one or more hierarchy of disk layers in VDI server 500. For example, referring to FIG. 5, virtual machine inventory database 615 may identify each virtual machine in VDI server 500 and determine which virtual machines in base disk layer 501 are associated with which set of virtual machines in department disk layer 502. In other embodiments, virtual machine inventory database 615 identifies one or more virtual disks descending from virtual disks in a predetermined disk layer. For example, referring to FIG. 5, virtual machine inventory database 615 may identify each department virtual disk 520 descending from a base virtual disk 515. In another example, virtual machine inventory database 615 may identify each user virtual disk 530 descending from a department virtual disk 520. In some embodiments, virtual machine inventory database 615 transmits the identification of one or more virtual machines to controller server 620. In other embodiments, controller server 620 identifies each virtual machine descending from the one or more virtual machines for a predetermined disk layer on which an update was successfully applied.

In one embodiment, controller server 620 processes data stored in virtual machine inventory database 615 to determine the predetermined disk layer in the hierarchy of disk layers. In some embodiments, controller server 620 receives an identification of one or more virtual machines from virtual machine inventory database 615 to determine the predetermined disk layer in the hierarchy of disk layers. In another embodiment, controller server 620 identifies one or more resources or software resources targeted by the one or more available updates to be applied to the desktop virtualization system. The controller server 620 processes the identification of the software resource targeted by an available update to determine the lowest (i.e. the least descendant) disk layer for each of the hierarchy of disk layers in the desktop virtualization system having the identified software resource available. In still another embodiment, controller server 620 applies an update to a plurality of virtual machines for a predetermined disk layer. In yet another embodiment, controller server 620 applies one or more updates to a plurality of virtual machines in the lowest disk layer for each of the hierarchy of disk layers in the desktop virtualization system having a targeted software resource available. In one of these embodiments, controller server 620 applies the update to one or more virtual machines in descendant disk layers in accordance with a disk combination algorithm. In another of these embodiments, controller server 620 applies the update to one or more virtual machines in a plurality of virtual machines associated with immediate descendant virtual disks in a subsequent disk layer in the hierarchy of disk layers. In yet another of these embodiments, controller server 620 applies the update to one or more virtual machines in a plurality of virtual machines associated with one or more virtual disks in the immediate descendant disk layer in the hierarchy of disk layers.

In one embodiment, controller server 620 applies each of the updates stored in updates database 610 to each virtual machine at each disk layer in the one or more hierarchy of disc layers within VDI server 500. In some of these embodiments, controller server 620 applies each update to each virtual machine in a hierarchy of disk layers in order of descending disk layers. For example, referring to FIG. 5, controller server 620 would first apply all updates stored in updates database 610 to each virtual machine at base disk layer 501. Next, controller server 620 would apply all updates stored in updates database 610 to each virtual machine at department disk layer 502. Finally, controller server 620 would apply all updates stored in updates database 610 to each virtual machine at user disk layer 503. In some embodiments, controller server 620 queries update history database 611 to determine whether a targeted virtual machine has already been offered an update. In other embodiments, controller server 620 queries update history database 611 to determine whether a disk layer has already been offered an update. In another embodiment, controller server 620 may not apply the update to virtual machines in a disk layer identified as having already received a targeted update. In some embodiments, controller server 620 applies an update to each virtual machine descending from the one or more virtual machines for a predetermined disk layer on which an update was successfully applied. In other embodiment where the controller server resides on a virtual machine, the controller server may communicate with update history database to determine which software application or resource a particular update will be applied.

In another embodiment, controller server 620 determines whether an update was applied (e.g., installed) to one or more targeted virtual machines for a predetermined disk layer within a hierarchy of disk layers. In some of these embodiments, if the update was successfully applied to the one or more targeted virtual machines associated with the predetermined disk layer, the controller server 620 suspends application of the update to any remaining virtual machines in the hierarchy of disk layers. In another of these embodiments, if the update was not successfully applied to the one or more targeted virtual machines associated with the predetermined disk layer, the controller server 620 applies the update to one or more virtual machines in a plurality of virtual machines associated with immediate descendant virtual disks in a subsequent disk layer in the hierarchy of disk layers. In yet another of these embodiments, if the update was not successfully applied to the one or more targeted virtual machines associated with the predetermined disk layer, the controller server 620 applies the update to one or more virtual machines in a plurality of virtual machines associated with one or more virtual disks in the immediate descendant disk layer in the hierarchy of disk layers. In other embodiments, controller server 620 identifies each virtual machine descending from the one or more virtual machines for a predetermined disk layer on which an update was successfully applied. In some embodiments, controller server 620 transmits the identification of an attempted update installation to update history database 611. In other embodiments, controller server 620 stores the update installation results in update history database 611. In still other embodiments, update history database 611 requests the identification of an attempted update installation from controller server 620. In one embodiment, update history database 611 generates a report identifying the history of attempts to apply one or more updates in the plurality of updates available for deployment to virtual machines in VDI server 500.

In some embodiments, VDI server 500 includes one or more hierarchy of disk layers. Each disk layer in each hierarchy of disk layers includes one or more virtual disks associated with that disk layer. In one embodiment, controller server 620 communicates with VDI server 500 to identify one or more disk layers in the one or more hierarchy of disk layers that requires an update. In another embodiment, controller server 620 communicates with virtual machine inventory database 615 to identify one or more virtual machines in VDI server 500 requiring an update. In yet another embodiment, virtual machine management server 602 executes on VDI server 500. In some embodiments, virtual machine management server 602 may communicate with controller server 620 to identify virtual machines 540 having software resources targeted by one or more available updates. In other embodiments, virtual machine management server 602 may communicate with controller server 620 to identify disk layers having software resources targeted by one or more available updates. In another embodiment, virtual machine management server 602 may associate each available software resource targeted by an update with one or more disk layers in a hierarchy of disk layers. In one of these embodiments, virtual machine management server 602 may store each association in a database. In another of these embodiments, virtual machine management server 602 may transmit data to controller server 620 relating to an association of a targeted software resource with the one or more disk layers in the hierarchy of disk layers. In some embodiments, controller server 602 may associate each available software resource targeted by an update with one or more disk layers in a hierarchy of disk layers.

FIG. 7 is a flow diagram illustrating an example process of updating a collection of software resources in a virtual desktop infrastructure, in accordance with one or more illustrative aspects described herein. In step 701, the update management server receives a plurality of updates for one or more software resources. In one embodiment, a VDI administrator identifies one or more updates to transmit to update management server 601. In another embodiment, update management server 601 transmits a request for a plurality of updates available for one or more software resources. In yet other embodiment, update management server 601 may transfer data representing the inventory of all system updates to update inventory database 612. In other embodiments, the plurality of updates for one or more software resources in the desktop virtualization system are stored in updates database 610. In still other embodiments, the plurality of updates for one or more software resources in the desktop virtualization system are stored in updates database 610.

In step 702, a plurality of virtual machines is identified for each disk layer in a hierarchy of disk layers on which to apply the plurality of updates. In one embodiment, virtual machine inventory database 615 identifies one or more virtual machines associated with a predetermined disk layer in the hierarchy of disk layers on which to apply the plurality of updates. In some embodiments, virtual machine inventory database 615 identifies one or more virtual disks descending from virtual disks in a predetermined disk layer. In other embodiments, virtual machine inventory database 615 transmits the identification of one or more virtual machines to controller server 620. In another embodiment, controller server 620 identifies each virtual machine descending from one or more virtual machines for a predetermined disk layer on which to apply the plurality of updates. In yet another embodiment, controller server 620 processes data stored in virtual machine inventory database 615 to determine the predetermined disk layer in the hierarchy of disk layers. In still another embodiment, controller server 620 identifies one or more resources or software resources targeted by the one or more available updates to be applied to the desktop virtualization system In step 703, the plurality of updates is applied to each of the plurality of virtual machines for a predetermined disk layer in the hierarchy of disk layers. In one embodiment, controller server 620 applies a plurality of updates to a plurality of virtual machines for a predetermined disk layer in the hierarchy of disk layers. In another embodiment, controller server 620 applies one or more updates to a plurality of virtual machines in the lowest disk layer for each of the hierarchy of disk layers in the desktop virtualization system having a targeted software resource available. In one of these embodiments, controller server 620 applies the update to one or more virtual machines in descendant disk layers in accordance with a disk combination algorithm. In another of these embodiments, controller server 620 applies the update to one or more virtual machines in a plurality of virtual machines associated with one or more virtual disks in the immediate descendant disk layer in the hierarchy of disk layers. In some embodiments, controller server 620 applies each update in the plurality updates to each virtual machine at each disk layer in the one or more hierarchy of disc layers within VDI server 500. In one of these embodiments, controller server 620 applies each update in the plurality updates to each virtual machine in a hierarchy of disk layers in order of descending disk layer.

In step 704, the controller server confirms whether one or more updates in the plurality of updates have been successfully applied to one or more virtual machines in the predetermined disk layer. In some embodiments, controller server 620 transmits an identification of an attempted update installation to update history database 611. In other embodiments, controller server 620 stores the update installation results in update history database 611. In still other embodiments, update history database 611 requests the identification of an attempted update installation from controller server 620. In another embodiment, update history database 611 generates a report identifying the history of attempts to apply one or more updates in the plurality of updates available for deployment in the desktop virtualization system.

In step 705, the controller server determines whether to apply one or more updates in the plurality of updates to one or more virtual machines in a subsequent disk layer in the hierarchy of disk layers wherein when an update in the plurality of updates has been successfully applied to one or more virtual machines in the predetermined disk layer, application of the update to each virtual machine in the plurality of virtual machines associated with subsequent disk layers in the hierarchy of disk layers is suspended; however, when an update in the plurality of updates has not been successfully applied to one or more virtual machines in the predetermined disk layer, the update is applied to each virtual machine in the plurality of virtual machines associated with the subsequent disk layer in the hierarchy of disk layers. In some embodiments, if the update was successfully applied to the one or more targeted virtual machines associated with the predetermined disk layer, the controller server 620 suspends application of the update to any remaining virtual machines in the hierarchy of disk layers. In another embodiment, if the update was not successfully applied to the one or more targeted virtual machines associated with the predetermined disk layer, the controller server 620 applies the update to one or more virtual machines in a plurality of virtual machines associated with one or more virtual disks in the immediate descendant disk layer in the hierarchy of disk layers.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

The invention claimed is:

1. A method for updating a collection of software resources in a virtual desktop infrastructure system, the method comprising:
receiving a plurality of updates for one or more software resources;
identifying a plurality of virtual machines for a predetermined disk layer in a hierarchy of disk layers on which to apply the plurality of updates;
applying the plurality of updates to each virtual machine in the plurality of virtual machines associated with the predetermined disk layer in the hierarchy of disk layers;
confirming whether one or more updates in the plurality of updates have been successfully applied to one or more virtual machines in the predetermined disk layer;
determining whether to apply one or more updates in the plurality of updates to one or more virtual machines in a subsequent disk layer in the hierarchy of disk layers wherein:
 i. when an update in the plurality of updates has been successfully applied to one or more virtual machines in the predetermined disk layer, suspending application of the update to each of the plurality of virtual machines associated with subsequent disk layers in the hierarchy of disk layers;
 ii. when an update in the plurality of updates has not been successfully applied to one or more virtual machines in the predetermined disk layer, applying the update to each of the plurality of virtual machines associated with the subsequent disk layer in the hierarchy of disk layers.

2. The method of claim 1, further comprising identifying a plurality of virtual machines descending from one or more virtual machines associated with the predetermined disk layer on which the update was successfully applied.

3. The method of claim 2, further comprising applying the update to each virtual machine in the plurality of virtual machines descending from the one or more virtual machines associated with the predetermined disk layer on which the update was successfully applied.

4. The method of claim 1, further comprising storing each of the plurality of received updates in a database.

5. The method of claim 1, further comprising storing update confirmation results for each of the plurality of virtual machines for one or more disk layers in the hierarchy of disk layers.

6. The method of claim 1, further comprising associating each software resource with one or more disk layers in the hierarchy of disk layers.

7. The method of claim 1, further comprising querying to determine an update status of one or more targeted disk layers.

8. A system for updating a collection of software resources in a virtual desktop infrastructure comprising:
an update management server comprising a first processor and a first memory storing computer readable instructions which, when executed by the first processor, configure the update management server to receive a plurality of updates for one or more software resources;
a controller server comprising a second processor and a second memory storing computer readable instructions which, when executed by the second processor, configure the controller server to:
identify a plurality of virtual machines for a predetermined disk layer in a hierarchy of disk layers on which to apply the plurality of updates,
apply the plurality of updates to each of the plurality of virtual machines associated with the predetermined disk layer in the hierarchy of disk layers,
confirm whether one or more updates in the plurality of updates have been successfully applied to one or more virtual machines in the predetermined disk layer, and
determine whether to apply one or more updates in the plurality of updates to one or more virtual machines in a subsequent disk layer in the hierarchy of disk layers wherein:
i. when an update in the plurality of updates has been successfully applied to one or more virtual machines in the predetermined disk layer, suspending application of said update to each of the plurality of virtual machines associated with subsequent disk layers in the hierarchy of disk layers;
ii. when an update in the plurality of updates has not been successfully applied to one or more virtual machines in the predetermined disk layer, applying said update to each of the plurality of virtual machines associated with the subsequent disk layer in the hierarchy of disk layers.

9. The system of claim 8, wherein the controller server is further configured to associate each identified software resource with one or more disk layers in the hierarchy of disk layers.

10. The system of claim 8, wherein the controller server is further configured to apply the update to each virtual machine in the plurality of virtual machines descending from the one or more virtual machines associated with the predetermined disk layer on which the update was successfully applied.

11. The system of claim 8, further comprising a graphical user interface.

12. The system of claim 11, wherein the graphical user interface is further configured to permit a user to identify one or more virtual machines to receive one or more updates in the plurality of updates.

13. The system of claim 11, wherein the graphical user interface is further configured to indicate the plurality of virtual machines descending from the one or more virtual machines in each disk layer.

14. The system of claim 11, wherein the first processor of the update management server is a different processor than the second processor of the controller server, and wherein the first memory of the update management server is a different memory than the second memory of the controller server.

15. A non-transitory computer readable medium storing executable instructions that, when executed, configure a system to:
receive a plurality of updates for one or more software resources;
identify a plurality of virtual machines for a predetermined disk layer in a hierarchy of disk layers on which to apply the plurality of updates;
apply the plurality of updates to each virtual machine in the plurality of virtual machines associated with the predetermined disk layer in the hierarchy of disk layers;
confirm whether one or more updates in the plurality of updates have been successfully applied to one or more virtual machines in the predetermined disk layer;
determine whether to apply one or more updates in the plurality of updates to one or more virtual machines in a subsequent disk layer in the hierarchy of disk layers wherein:
i. when an update in the plurality of updates has been successfully applied to one or more virtual machines in the predetermined disk layer, suspending application of the update to each of the plurality of virtual machines associated with subsequent disk layers in the hierarchy of disk layers;
ii. when an update in the plurality of updates has not been successfully applied to one or more virtual machines in the predetermined disk layer, applying the update to each of the plurality of virtual machines associated with the subsequent disk layer in the hierarchy of disk layers.

16. The non-transitory computer readable medium of claim 15, wherein the executable instructions, when executed, further cause the system to:
identify a plurality of virtual machines descending from one or more virtual machines associated with the predetermined disk layer on which the update was successfully applied.

17. The non-transitory computer readable medium of claim 16, wherein the executable instructions, when executed, further cause the system to:
apply the update to each virtual machine in the plurality of virtual machines descending from the one or more virtual machines associated with the predetermined disk layer on which the update was successfully applied.

18. The non-transitory computer readable medium of claim 15, wherein the executable instructions, when executed, further cause the system to:
store each of the plurality of received updates in a database.

19. The non-transitory computer readable medium of claim 15, wherein the executable instructions, when executed, further cause the system to:
store update confirmation results for each of the plurality of virtual machines for one or more disk layers in the hierarchy of disk layers.

20. The non-transitory computer readable medium of claim 15, wherein the executable instructions, when executed, further cause the system to:
  associate each software resource with one or more disk layers in the hierarchy of disk layers.

21. The non-transitory computer readable medium of claim 15, wherein the executable instructions, when executed, further cause the system to:
  query to determine an update status of one or more targeted disk layers.

* * * * *